United States Patent
Huang

(10) Patent No.: US 10,919,132 B2
(45) Date of Patent: Feb. 16, 2021

(54) QUICK RELEASE DEVICE OF HAND TOOL

(71) Applicant: SHUN-YEE INDUSTRIAL CO., LTD., Taichung (TW)

(72) Inventor: Yi-Ching Huang, Taichung (TW)

(73) Assignee: SHUN-YEE INDUSTRIAL CO., LTD., Taichung (TW)

( * ) Notice: Subject to any disclaimer, the term of this patent is extended or adjusted under 35 U.S.C. 154(b) by 427 days.

(21) Appl. No.: 15/927,613

(22) Filed: Mar. 21, 2018

(65) Prior Publication Data
US 2018/0207775 A1 Jul. 26, 2018

Related U.S. Application Data

(63) Continuation-in-part of application No. 14/707,890, filed on May 8, 2015, now abandoned.

(51) Int. Cl.
| | | |
|---|---|---|
| *B25B 23/00* | (2006.01) | |
| *F16B 21/12* | (2006.01) | |
| *F16B 21/16* | (2006.01) | |

(52) U.S. Cl.
CPC ...... *B25B 23/0035* (2013.01); *B25B 23/0014* (2013.01); *B25B 23/0028* (2013.01);
(Continued)

(58) Field of Classification Search
CPC ............ B25B 23/0007; B25B 23/0014; B25B 23/0028; B25B 23/0035; B25B 23/0057;
(Continued)

(56) References Cited

U.S. PATENT DOCUMENTS

| | | | | |
|---|---|---|---|---|
| 1,864,466 | A | * | 6/1932 | Peterson ............. B25B 23/0035 403/365 |
| 4,768,405 | A | * | 9/1988 | Nickipuck ............ B25B 15/001 403/325 |

(Continued)

FOREIGN PATENT DOCUMENTS

| | | | |
|---|---|---|---|
| DE | 9106296 U1 | * 10/1991 | ............ F16B 21/165 |
| TW | M436544 | 9/2012 | |

OTHER PUBLICATIONS

"Standard Tolerance Limits and Fits." Engineer's Edge. Jan. 07, 2014, [online], [retrieved on Jul. 16, 2020] Retrieved from the Internet <URL: https://web.archive.org/web/20140701161959/https://www.engineersedge.com/mechanical,045tolerances/preffered-mechanical-tolerances.htm>.*

*Primary Examiner* — Josh Skroupa
(74) *Attorney, Agent, or Firm* — Muncy, Geissler, Olds & Lowe, P.C.

(57) ABSTRACT

A quick release device of a hand tool includes: a main body; an operating portion, including a slidable sleeve movably disposed around the main body and a pin radially inserted into the slidable sleeve, the operating portion further including a movable rod movably disposed in the main body, the pin connected with the movable rod; an annular plastic body, rotatably disposed around the slidable sleeve and corresponding to the pin, a stepped structure formed between the slidable sleeve and the annular plastic body; an identification portion, disposed around the annular plastic body; wherein the slidable sleeve is movable between first and second positions, when the slidable sleeve moves toward the first position, the pin drives the movable rod to move toward a fixing position; when the slidable sleeve moves toward the second position, the pin pushes the movable rod to move toward a releasing position.

12 Claims, 3 Drawing Sheets

(52) U.S. Cl.
CPC .......... *F16B 21/125* (2013.01); *F16B 21/165* (2013.01); *Y10T 403/592* (2015.01); *Y10T 403/604* (2015.01)

(58) Field of Classification Search
CPC .......... B25G 3/18; F16B 21/12; F16B 21/125; F16B 21/165; F16D 1/10; Y10T 403/591; Y10T 403/592; Y10T 403/602; Y10T 403/604
USPC .......... 464/901; 403/322.1, 322.2, 327, 328, 403/DIG. 4; 81/177.85
See application file for complete search history.

(56) References Cited

U.S. PATENT DOCUMENTS

| | | | |
|---|---|---|---|
| 4,865,485 A * | 9/1989 | Finnefrock, Sr. | ... B25B 23/0021 403/322.2 |
| 6,257,096 B1 | 7/2001 | Ling | |
| 6,379,072 B1 * | 4/2002 | Brown | ................ B29C 45/1775 403/31 |
| 6,523,441 B2 * | 2/2003 | Lee | ..................... B25B 23/0021 403/322.1 |
| 7,013,766 B2 * | 3/2006 | Lee | ..................... B25B 23/0021 403/325 |
| 7,152,511 B2 | 12/2006 | Fen | |
| 7,387,053 B2 | 6/2008 | Lee | |
| 7,987,748 B2 | 8/2011 | Chiu | |
| 8,032,991 B2 | 10/2011 | Lawless | |
| D649,417 S | 11/2011 | Gresham | |
| 8,156,846 B2 | 4/2012 | Chi | |
| 8,225,479 B2 * | 7/2012 | Clinch | .............. B29C 66/43421 403/270 |
| 8,651,764 B2 | 2/2014 | Lin | |
| 8,979,527 B2 | 3/2015 | Bich | |
| 2002/0162426 A1 * | 11/2002 | Lee | ..................... B25B 23/0021 81/177.85 |
| 2004/0126182 A1 * | 7/2004 | Lin | ..................... B25B 23/0021 403/322.2 |
| 2006/0027054 A1 | 2/2006 | Wang | |
| 2006/0201289 A1 * | 9/2006 | Davidson | ............ B25B 23/0035 81/177.85 |
| 2007/0163084 A1 | 7/2007 | Liou | |
| 2007/0189847 A1 * | 8/2007 | Lee | ..................... B25B 23/0035 403/322.1 |
| 2008/0148910 A1 | 6/2008 | Chiu | |
| 2008/0196560 A1 * | 8/2008 | Hsieh | ....................... B25G 3/18 81/177.85 |
| 2011/0260415 A1 | 10/2011 | Lin | |
| 2013/0149027 A1 | 6/2013 | Lin | |
| 2013/0330140 A1 | 12/2013 | Shiao | |
| 2013/0333527 A1 | 12/2013 | Su | |
| 2013/0336713 A1 | 12/2013 | Su | |
| 2014/0174263 A1 * | 6/2014 | Moss | .................. B25B 23/0028 81/125 |
| 2014/0318327 A1 | 10/2014 | Yang | |

\* cited by examiner

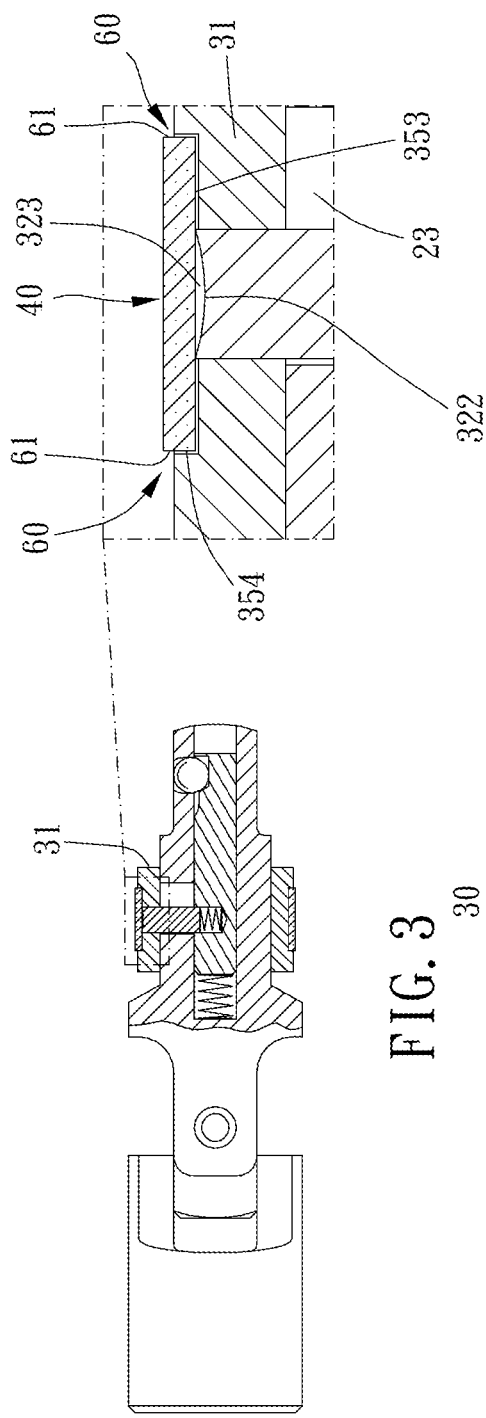
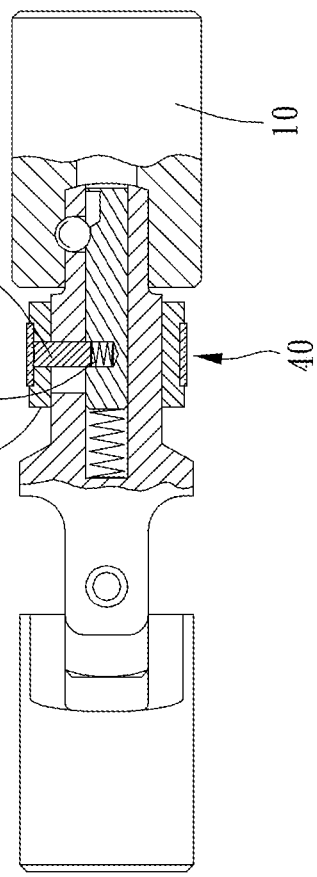
FIG. 3
FIG. 3A
FIG. 4

QUICK RELEASE DEVICE OF HAND TOOL

The present invention is a CIP of application Ser. No. 14/707,890, filed May 8, 2015, the entire contents of which are hereby incorporated by reference.

BACKGROUND OF THE INVENTION

Field of the Invention

Description of the Prior Art

A conventional quick release device of a hand tool as disclosed in TWM436544 at least includes a main body, a controller, a sleeve member and at least one restricting member, and a user can assemble the quick release device to the hand tool directly.

However, the quick release device mentioned above does not have an identification mark for the user to identify a dimension of the quick release device; therefore, the user is unable to identify and choose the appropriate quick release device quickly. In the above-mentioned structure, the sleeve member cannot be pushed and operated directly, and the sleeve member is not provided with a structure which allows the user to push the sleeve member easily.

U.S. Pat. No. 8,156,846 discloses that the pin is not axially slidable relative to the main body, the slidable sleeve is and has to be rotatable relative to the main body, the pin is and has to be rotatable relative to the movable rod, and the slidable sleeve is not axially slidable together with the movable rod relative to the main body. The movable rod is just driven to rotate to allow release of the ball back into the main body.

U.S. Pat. Nos. 7,387,053, 8,979,527 and US2006/0027054 each disclose nothing but merely the annular plastic body disposed around the slidable sleeve.

The present invention has arisen to mitigate and/or obviate the afore-described disadvantages.

SUMMARY OF THE INVENTION

The major object of the present invention is to provide a quick release device of a hand tool which has a stepped structure for a user to grip firmly thereon and apply force easily thereto and is easy for the user to operate. In addition, the quick release device may include an annular body made of thermoplastic polyester elastomer (TPEE), so the quick release device is flexible and transformable to be assembled to a tool easily and is rotatable. Furthermore, the quick release device has identification marks showing a pattern or a dimension of the tool, and the identification marks can be rotated to a side that the user can see clearly.

To achieve the above and other objects, a quick release device of a hand tool is provided for being assembled with a tool. The quick release device includes: a main body; an operating portion, including a slidable sleeve operably and movably disposed around the main body and a pin radially inserted into the slidable sleeve, the operating portion further including a movable rod movably disposed in the main body, the pin connected with the movable rod; an annular plastic body, rotatably disposed around the slidable sleeve and corresponding to the pin, a stepped structure being formed between the slidable sleeve and the annular plastic body; an identification portion, disposed around an outer annular face of the annular plastic body; wherein, the slidable sleeve is movable between a first position and a second position, when the slidable sleeve moves toward the first position, the pin drives the movable rod to move toward a fixing position; when the slidable sleeve moves toward the second position, the pin pushes the movable rod to move toward a releasing position.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is a partial cross-sectional drawing of the preferred embodiment of the present invention;

FIG. 3A is a partial enlarged view of FIG. 3;

FIG. 4 is another partial cross-sectional drawing of the preferred embodiment of the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
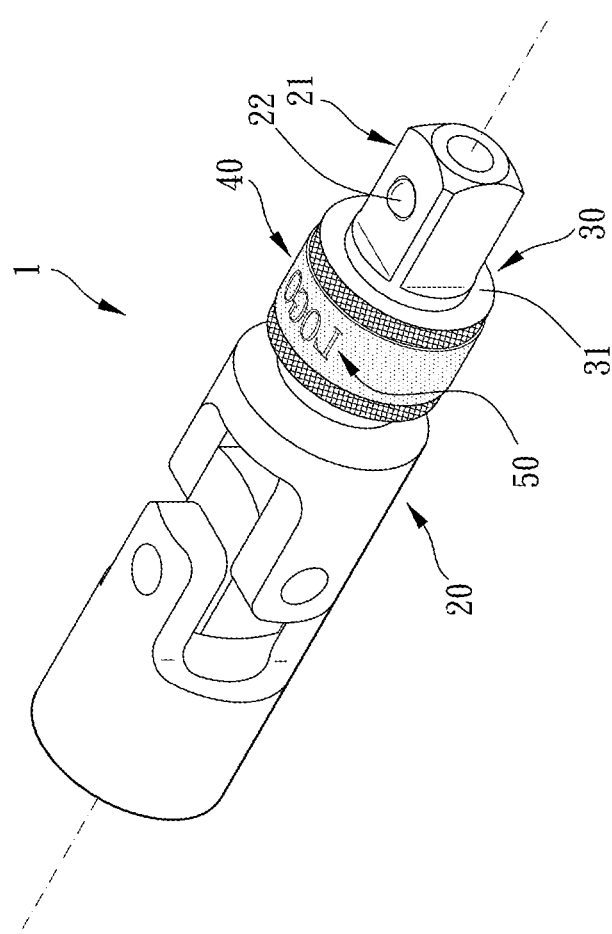
FIG. 1 is a drawing showing a preferred embodiment of the present invention.
Figure 2:
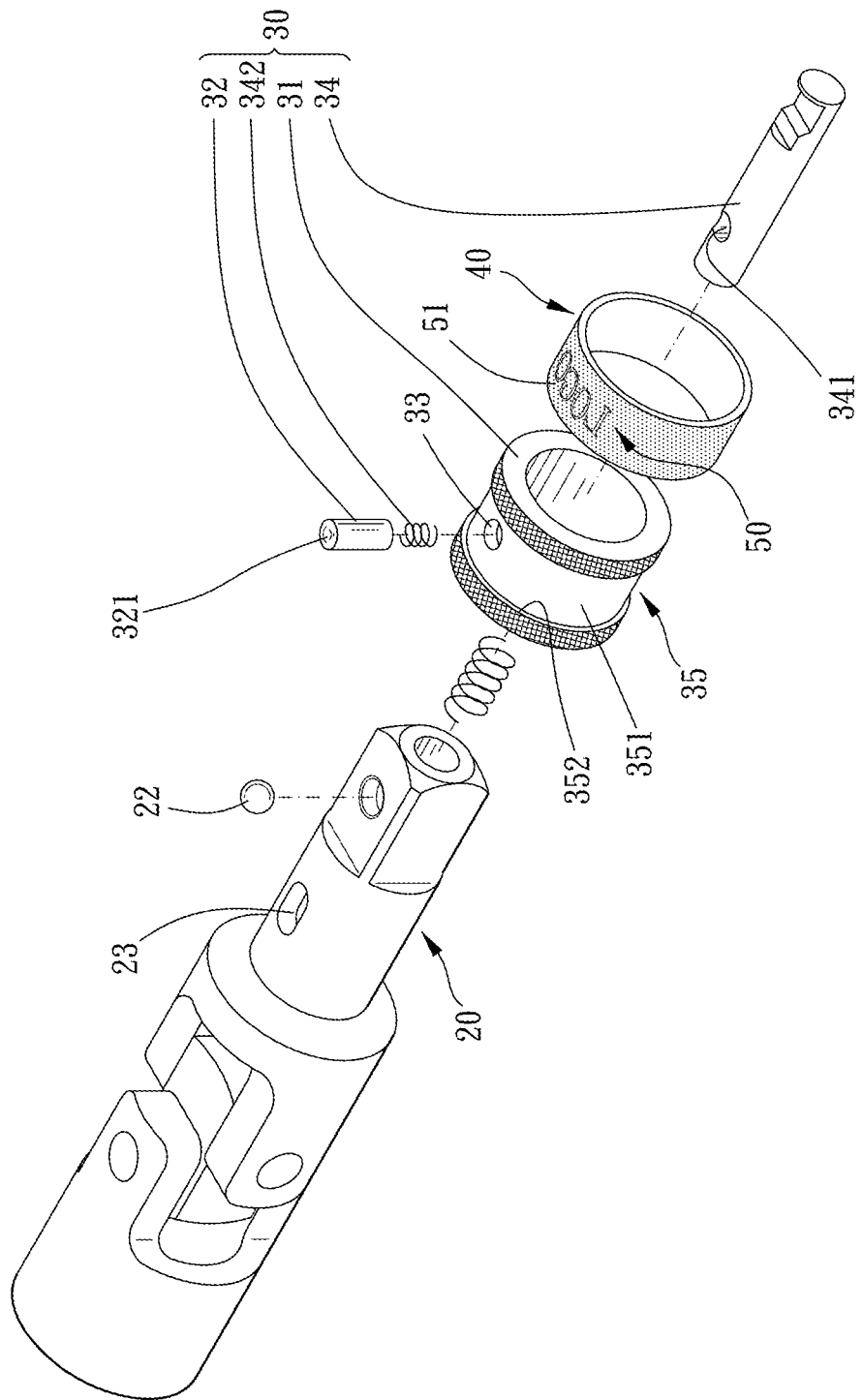
FIG. 2 is a breakdown drawing of the preferred embodiment of the present invention.

Please refer to FIGS. 1 to 3, 3A and 4 for a preferred embodiment of the present invention. A quick release device 1 of a hand tool is provided for being assembled with a tool 10. The quick release device 1 includes a main body 20, an operating portion 30, an annular plastic body 40 and an identification portion 50.

The main body 20 includes at least one engaging portion 21, and the engaging portion 21 is provided for being assembled and engaged with the tool 10 (for example, a socket or an adapter for a pneumatic tool). The operating portion 30 includes a slidable sleeve 31 for being operably and movably disposed around the main body 20 and a pin 32 radially inserted into the slidable sleeve 31. Specifically, the slidable sleeve 31 may include a hole 33, and the pin 32 may be disposed through the hole 33. In other embodiments, an end of the pin 32 tight-fittingly abuts against an inner surface around the hole 33 to allow the pin 32 to be disposed in the slidable sleeve 31 stably.

The operating portion 30 further includes a movable rod 34 movably disposed in the main body 20, and the pin 32 is connected with the movable rod 34. More specifically, the engaging portion 21 may have a restricting member 22 which is drivable by the movable rod 34 to partially protrude out of or retract below a surface of the engaging portion 21, and the engaging portion 21 is provided for controlling the restricting member 22 through moving the slidable sleeve 31 (for example, sliding toward a predetermined direction). The restricting member 22 can be engaged or disengaged with the tool 10.

The annular plastic body 40 is rotatably disposed around the slidable sleeve 31 and corresponds to the pin 32. Specifically, the slidable sleeve 31 may include an annular slot 35 recessed therearound, the annular plastic body 40 is restrictedly disposed in the annular slot 35, and the annular slot 35 has an annular bottom face 351 and two lateral walls 352 disposed annularly on two opposite sides thereof. A first gap 353 may be formed between an inner circumferential face of the annular plastic body 40 and the annular bottom face 351, or a second gap 354 may be formed between two opposite sides of the annular plastic body 40 and the two lateral walls 352 to prevent the annular plastic body 40 and the annular slot 35 from producing great abrasion and to make the annular plastic body 40 rotatable easily. An outer surface of the annular plastic body 40 may be integrally and protrudingly formed with granules, a diamond pattern or others to allow the user to rotate the annular plastic body 40 easily. The annular plastic body 40 can block an end of the pin 32 effectively to prevent the pin 32 from falling off.

It is to be noted that the annular plastic body 40 may be made of rubber or plastic by hot press injection molding. For example, the annular plastic body 40 may be an annular body made of thermoplastic polyester elastomer (TPEE), so the annular plastic body 40 is flexible and transformable to be assembled with other elements (such as the slidable sleeve) easily. More specifically, the annular plastic body 40 may be expanded to be disposed around the slidable sleeve 31, and the annular plastic body 40 may be retracted to be engaged with the slidable sleeve 31.

Furthermore, a stepped structure 60 is formed between the slidable sleeve 31 and the annular plastic body 40, and the stepped structure 60 is at two annular sides 61 of the annular plastic body 40. In this embodiment, the outer annular face 51 of the annular plastic body 40 is relatively higher than an annular face of an end peripheral edge of the slidable sleeve 31. The stepped structure 60 may be provided for the user to operate and move the slidable sleeve 31 more easily. Specifically, when the user, for example, grips on the slidable sleeve 31, the stepped structure 60 between the slidable sleeve 31 and the annular plastic body 40 allows the user to grip firmly thereon and apply force thereto and makes it easier for the user to operate the slidable sleeve 31 to make the engaging portion 21 and the tool 10 engaged or disengaged with each other.

The identification portion 50 is disposed around an outer annular face 51 of the annular plastic body 40, and the identification portion 50, for example, may show a pattern or a dimension of the tool for the user to identify. Furthermore, the identification portion 50, for example, may include a pattern portion protrudingly or recessedly disposed on the outer annular face 51 of the annular plastic body 40. Preferably, the identification portion 50 and the annular plastic body 40 may be integrally formed so that it is quick and convenient to manufacture the identification portion 50 and the annular plastic body 40. In addition, the identification portion 50 may include a printed portion printed on the outer annular face 51 of the annular plastic body 40, and the annular plastic body 40 may be formed with the printed portion on the outer annular face 51 thereof through ink jet printing or thermal transfer printing. It is to be noted that the user may rotate the identification portion 50 to a predetermined position by rotating the annular plastic body 40, and the predetermined position is a position which the user can see clearly and easily. In addition, the annular plastic body 40 and the slidable sleeve 31 may be positioned to the predetermined position via a positioning mechanism such as male-female engagement.

In actual practice, the slidable sleeve 31 is provided for being operated to move between a first position and a second position. When the slidable sleeve 31 moves toward the first position, the pin 32 drives the movable rod 32 to move toward a fixing position, and when the movable rod 34 is in the fixing position, the engaging portion 21 may be engaged with the tool 10. When the slidable sleeve 31 moves toward the second position, the pin 32 pushes the movable rod 34 to move toward a releasing position, and when the movable rod 34 is in the releasing position, the engaging portion 21 may be disengaged with the tool 10. The movable rod 34 may further include an assembling hole 341 (the assembling hole 341 may be through or non-through), and the operating portion 30 may further include an elastic member 342 disposed in the assembling hole 341. The pin 32 is at least partially inserted into the assembling hole 341, and the elastic member 342 is abutted between the pin 32 and the assembling hole 341. The pin 32 has a tendency to move outward, and an end of the pin 32 abuts against the annular plastic body 40. The pin 32 and the annular plastic body 40 abut against each other so that the annular plastic body 40 can be positioned.

The main body 20 includes an elongate through slot 23 extending axially, the pin 32 is disposed through the slidable sleeve 31 and the elongate through slot 23, the pin 32 is further radially inserted into the movable rod 34 and axially slidable relative to the main body 20 along the elongate through slot 23, and the pin 32 is non-rotatable relative to the movable rod 34, the slidable sleeve 31. The pin 32 and the movable rod 34 are axially slidable relative to the main body 20 at the same time and are non-rotatable relative to the main body 20. The elastic member 342 may be omitted and the pin 32 may be fixedly radially inserted (such as in tight fit, with slight deformation, or the like) into the movable rod 34 or/and the slidable sleeve 31. An end face 321 of the pin 32 includes a concave 322 facing the annular plastic body 40. The annular plastic body 40 contacts the end face 321, and a space 323 is formed between the annular plastic body 40 and the end face 321, thus lowering frictional resistance when the annular plastic body 40 rotates relative to the slidable sleeve 31.

A stepped structure may be at two annular sides of the annular plastic body, and the outer annular face of the annular plastic body is relatively lower than the annular face of the end peripheral edge of the slidable sleeve. The stepped structure allows the user to grip firmly thereon and apply force thereto and makes it easier for the user to operate the quick release device.

Given the above, the quick release device has a stepped structure for the user to grip firmly thereon and apply force easily thereto and is easy for the user to operate. In addition, the quick release device may include an annular body made of thermoplastic polyester elastomer (TPEE), so the quick release device is flexible and transformable to be assembled to a tool easily and is rotatable. Furthermore, the quick release device has identification marks showing a pattern or a dimension of the tool, and the identification marks can be rotated to a side that the user can see clearly.

While we have shown and described various embodiments in accordance with the present invention, it should be clear to those skilled in the art that further embodiments may be made without departing from the scope of the present invention.

What is claimed is:

1. A quick release device of a hand tool provided for being assembled with a tool, the quick release device including:
   a main body;
   an operating portion, including a slidable sleeve operably and movably disposed around the main body and a pin radially inserted into the slidable sleeve, the operating portion further including a movable rod movably disposed in the main body, the pin connected with the movable rod;

an annular plastic body, rotatably disposed around the slidable sleeve and corresponding to the pin, a stepped structure being formed between the slidable sleeve and the annular plastic body;

an identification portion, disposed around an outer annular face of the annular plastic body;

wherein the slidable sleeve is movable between a first position and a second position, when the slidable sleeve moves toward the first position, the pin drives the movable rod to move toward a fixing position; when the slidable sleeve moves toward the second position, the pin pushes the movable rod to move toward a releasing position;

wherein the main body includes an elongate through slot extending axially, the pin is disposed through the slidable sleeve and the elongate through slot, the pin is further radially inserted into the movable rod and axially slidable relative to the main body along the elongate through slot, the pin is non-rotatable relative to the movable rod, the slidable sleeve, the pin and the movable rod are axially slidable relative to the main body at the same time and are non-rotatable relative to the main body;

wherein the movable rod further includes an assembling hole which is a circular blind hole, the operating portion further includes an elastic member disposed in the assembling hole, the pin is at least partially inserted into the assembling hole, the elastic member is abutted between the pin and the assembling hole, the pin has a tendency to move outward, and an end of the pin abuts against the annular plastic body;

wherein an end face of the pin includes a concave facing the annular plastic body, a periphery of the end face of the pin contacts the annular plastic body, and a space is formed between the annular plastic body and the end face and correspondingly located within the periphery of the end face of the pin;

wherein the pin has a length larger than a depth of the assembling hole and larger than a longitudinal extent of the elastic member.

2. The quick release device of a hand tool of claim 1, wherein the stepped structure is at two annular sides of the annular plastic body, and the outer annular face of the annular plastic body is relatively higher than an annular face of an end peripheral edge of the slidable sleeve.

3. The quick release device of a hand tool of claim 1, wherein the annular plastic body is an annular body made of thermoplastic polyester elastomer (TPEE).

4. The quick release device of a hand tool of claim 1, wherein the slidable sleeve further includes an annular slot recessed therearound, and the annular plastic body is restrictedly disposed in the annular slot.

5. The quick release device of a hand tool of claim 4, wherein the annular slot has an annular bottom face, and a first gap is formed between an inner circumferential face of the annular plastic body and the annular bottom face.

6. The quick release device of a hand tool of claim 4, wherein the annular slot has two lateral walls disposed annularly on two opposite sides thereof respectively, and a second gap is formed between two opposite sides of the annular plastic body and the two lateral walls.

7. The quick release device of a hand tool of claim 1, wherein the slidable sleeve further includes a hole, the pin is inserted into the hole, and an end of the pin abuts against an inner surface around the hole.

8. The quick release device of a hand tool of claim 1, wherein the identification portion includes a pattern portion protrudingly disposed on the outer annular face of the annular plastic body.

9. The quick release device of a hand tool of claim 1, wherein the identification portion includes a pattern portion recessedly disposed on the outer annular face of the annular plastic body.

10. The quick release device of a hand tool of claim 1, wherein the identification portion includes a printed portion printed on the outer annular face of the annular plastic body.

11. The quick release device of a hand tool of claim 1, wherein the pin is fixedly radially inserted into the slidable sleeve.

12. The quick release device of a hand tool of claim 1, wherein the pin is fixedly radially inserted into the movable rod.

* * * * *